United States Patent
Obaidi et al.

(10) Patent No.: US 11,490,322 B2
(45) Date of Patent: Nov. 1, 2022

(54) PROVISIONING OF NETWORK SLICING IN A COMMUNICATION SYSTEM

(71) Applicant: T-Mobile USA, Inc., Bellevue, WA (US)

(72) Inventors: Ahmad Arash Obaidi, Sammamish, WA (US); Christopher Joul, Bellevue, WA (US); Jean-Luc Bouthemy, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/827,334

(22) Filed: Mar. 23, 2020

(65) Prior Publication Data

US 2021/0297933 A1 Sep. 23, 2021

(51) Int. Cl.
*H04W 48/16* (2009.01)
*H04W 48/18* (2009.01)
*H04W 16/02* (2009.01)

(52) U.S. Cl.
CPC .......... *H04W 48/16* (2013.01); *H04W 16/02* (2013.01); *H04W 48/18* (2013.01)

(58) Field of Classification Search
CPC ...... H04W 48/16; H04W 16/02; H04W 48/18
USPC ........................................................ 370/328
See application file for complete search history.

(56) References Cited

U.S. PATENT DOCUMENTS

| | | | |
|---|---|---|---|
| 9,480,046 B1 | 10/2016 | Mehta et al. | |
| 10,254,928 B1 | 4/2019 | Jesensky et al. | |
| 11,327,455 B2 | 5/2022 | Cella et al. | |
| 11,330,548 B2 | 5/2022 | Chastain et al. | |
| 2013/0054426 A1 | 2/2013 | Rowland et al. | |
| 2013/0291075 A1 | 10/2013 | Sirotkin et al. | |
| 2015/0098393 A1 | 4/2015 | Tofighbakhsh et al. | |
| 2016/0112943 A1 | 4/2016 | Horn et al. | |
| 2017/0235848 A1 | 8/2017 | Van Dusen et al. | |
| 2018/0007557 A1 | 1/2018 | Lee et al. | |
| 2018/0124059 A1 | 5/2018 | Kubisch et al. | |
| 2018/0359337 A1 | 12/2018 | Kodaypak et al. | |
| 2019/0372837 A1 | 12/2019 | Yang et al. | |
| 2020/0187106 A1* | 6/2020 | Salkintzis | H04W 4/50 |
| 2021/0101679 A1 | 4/2021 | Han et al. | |
| 2021/0160131 A1 | 5/2021 | Maguire et al. | |
| 2021/0297846 A1 | 9/2021 | Obaidi et al. | |
| 2021/0297857 A1 | 9/2021 | Obaidi et al. | |

(Continued)

OTHER PUBLICATIONS

U.S. Appl. No. 16/827,374, Office Action dated Jul. 26, 2021, 20 pages.

(Continued)

*Primary Examiner* — Chuck Huynh
(74) *Attorney, Agent, or Firm* — Han Santos, PLLC

(57) ABSTRACT

A network provider implements network slicing. Network instances are instantiated on a communication network that are configured to provide a configured set of services that are accessible to a controlled set of devices. When a first device is either registered or authenticated with the communication network or has entered a service area, a service profile is identified and analyzed. In response to determining that the service profile matches a configured set of services for one of the instantiated network instances, the first device is enabled to access the matching instantiated network instance.

20 Claims, 7 Drawing Sheets

(56) References Cited

U.S. PATENT DOCUMENTS

2021/0297933 A1    9/2021  Obaidi et al.
2022/0060901 A1    2/2022  Rajendran et al.

OTHER PUBLICATIONS

U.S. Appl. No. 16/827,374, Final Office Action dated Dec. 20, 2021, 41 pages.
U.S. Appl. No. 16/827,374, Office Action dated Apr. 13, 2022, 25 pages.
U.S. Appl. No. 16/827,401, Office Action dated May 16, 2022, 81 pages.

* cited by examiner

PROVISIONING OF NETWORK SLICING IN A COMMUNICATION SYSTEM

BACKGROUND

The 3rd Generation Partnership Project (3GPP) has defined specifications for communications devices covering technologies such as Global System for Mobile Communications (GSM), Universal Mobile Telecommunications System (UMTS), and Long-Term Evolution (LTE) and 5G. 3GPP has defined some specifications for network slicing in 5G networks. Network slicing enables the multiplexing of virtualized and independent logical networks on a physical network infrastructure, and isolates groups of network functions from other network functions. Network slicing allows the network infrastructure to host multiple logical networks that appear and operate as independent networks to a connected user.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1A:
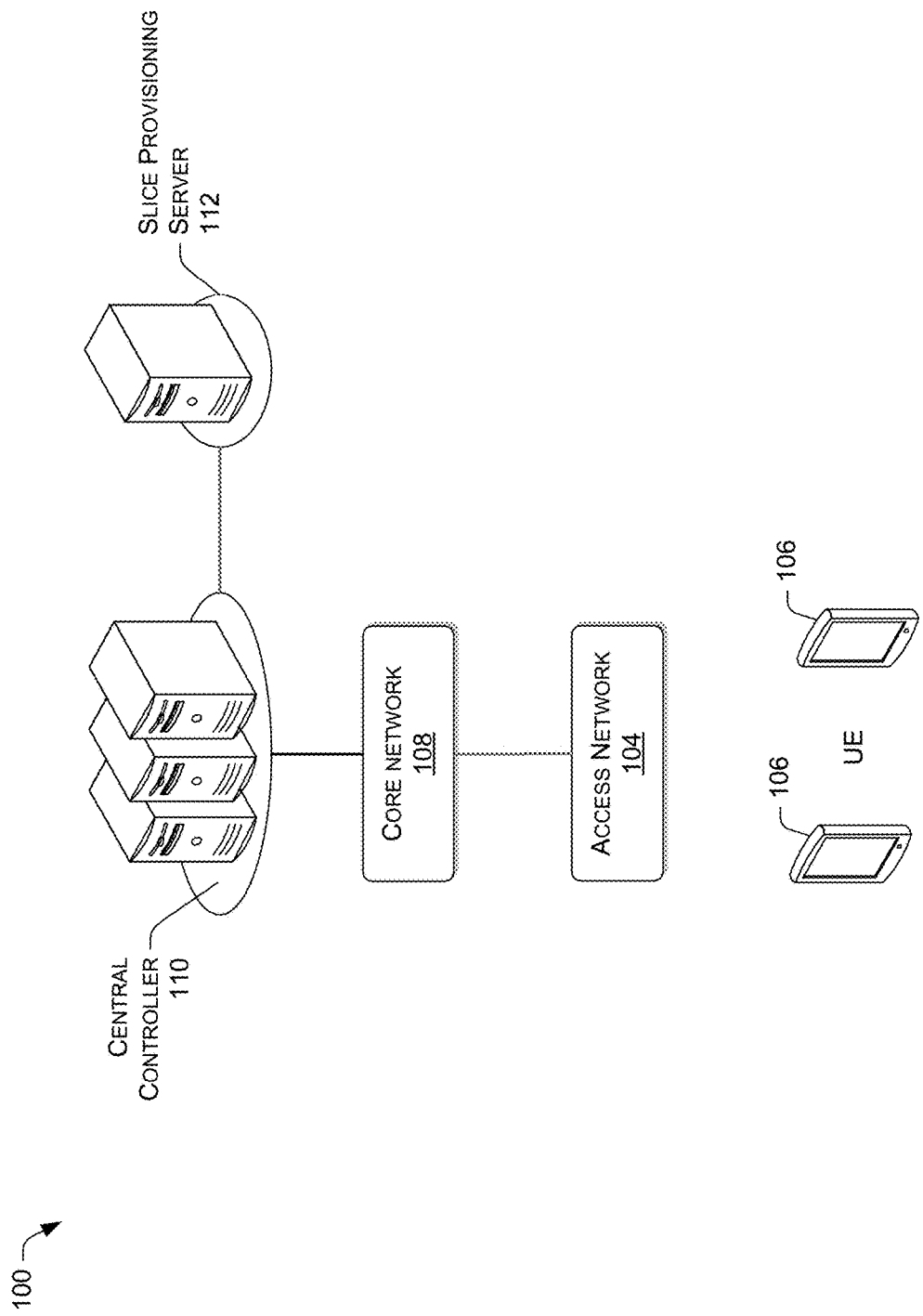
FIG. 1A illustrates an example architecture that implements a network with network slicing.

Network slicing is a concept that allows various networks to be created for specific service needs. Each network may be configured with different characteristics such as scalability, throughput, latency, and security, and may provide network services utilizing both virtual and physical elements to a clearly defined user, organization, or group of organizations. Network slicing may provide a number of features such as tailored quality-of-service requirements, high security requirements, isolation from other networks, guaranteed performance, and privacy.

The disclosure provides a way to characterize attributes of the network slices that are active in the network or that can be generated, and dynamically match network slices to users based on the user's profile and charging model or fee structure. In one embodiment, a machine learning/artificial intelligence (AI) engine can be used to dynamically provision services for users based on profiles, slice attributes, and network capacity. An identified user device can be added to either an existing network slice or the user device can be dynamically assigned to a new network slice.

In some embodiments, network slices may be allocated to cloud service providers to implement secure connectivity for mobile device users. For example, a virtual machine may be allocated to a user by a cloud provider, and a network slice may be allocated by a wireless network provider that may be used to provide secure connectivity and computing resources between the allocated virtual machine and a UE associated with the virtual machine.

More generally, network slices may be allocated to provide a specific set of quality-of-service, security, and performance characteristics for a specified user. For example, one use case may be a provider of drone delivery services who may require high security and low latency for when communications are needed for a drone, but who may not require a high level of computing resources. Another example may be a network slice for a banking services provider, who may require high security communications and storage but not necessarily low latency. A health/medical provider may not only require high security and privacy but may also require low latency to support e-medicine services and other time-sensitive services.

In an embodiment, a network slice profile may be established for a user that defines the network slice requirements for that user. In some embodiments, the network slice profile may be generated based on one more selectable parameters that have been established by the network provider. Selectable parameters may be provided for each of a number of categories such as latency, security, quality of service, storage, and the like. For example, a user may select one of four levels of security that are provided by the network provider. In at least one embodiment, the user may select a custom setting for one or more of the parameters.

In some embodiments, the UE may be associated with an entity such as an enterprise or as part of an Internet of Things (IoT) group. In one example scenario, it may be desirable for enterprises to configure their UEs to be automatically connected and configured per enterprise specifications when the UEs connect to the network (including a wireless network). Additionally, an enterprise or owner of the IoT group may provide a list of UEs that are to be provisioned for a selected network slice with a configured set of services. When a UE on the list of UEs is detected and identified by the network provider (including a wireless service provider), if the network slice associated with the UE has not yet been instantiated, then the network provider can instantiate and activate the network slice. If the network slice associated with the UE has already been instantiated, then the network provider can add the identified UE to the instantiated network slice.

A network provider, for example a wireless service provider, may apply a different security posture to each of these different network slices and charge for those services accordingly using a machine learning/AI engine to dynamically provision security services. In one example, when a drone connects to a network (for example, via a SIM card), the network provider may interrogate the drone and, based on the needs of the service being utilized by that drone, auto-provision the drone to either an existing network slice or dynamically assign that drone to a new network slice. The security policies applied to a newly created network slice may be dynamically determined.

The network provider, for example a wireless service provider, may further offer security-as-a-service for different network slices. In one embodiment, an orchestrator engine or a provisioning engine may be configured to dynamically provision a specific instance of a network slice with the security capabilities required based on the services' requirements and based on the ability of the subscriber to pay for that service.

For example, in an oil and gas setting, the network provider, for example a wireless service provider, can offer different security levels for IoT devices connected to the network provider based on the user's agreement with the network provider. The security levels can provide a range of services from minimal to maximum security services that may be dynamically provisioned based on the user's needs.

The disclosure provides a way to tailor security attributes of the network slices that are active in the network or that can be dynamically generated, and dynamically match slices to network users based on the user's profile and fee structure. A user device can be added to either an existing network slice or the user device can be dynamically provisioned to a new network slice. A network slice can be generated with lower security restrictions based on the user's authentication and associated access control, for example using Role Based Access Control (RBAC) or role-based security. For users with lower security settings enabled, their associated data traffic can be routed to a network slice with minimal security restrictions. As additional security restrictions are added to the user's authentication level (and device level), the user data can dynamically be routed to a higher-level security network slice. For example, video streaming services or social media services may be offered on a lower security network slice, while banking services may be offered on a network slice with higher security settings.

In general, for users who have minimal security flags enabled, their UE traffic may be routed to a network slice with minimal restrictions. As additional security restrictions are added to the user's authentication level (and UE level), data traffic for these users may be routed to a higher-level security network slice. When the user profile is created for each user, a role may be assigned to the user. When the user profile is created for an entity such as an enterprise, the entity may be provided a number of roles that may be selected for various subscription profiles that are available for UEs associated with that entity. Each role may in turn be associated with a specified security level.

In some scenarios, for example in a 4G LTE network, there may be no existing implementation that enables network slicing. However, precursors of network slicing (Dedicated Core Networks Selection, DECOR, and enhanced Dedicated Core Networks Selection, eDECOR) have been defined by 3GPP for 4G LTE. While 3GPP has already defined network slicing for 5G, one may expect the same concepts to be implemented in 4G LTE technologies in the foreseeable future. Use cases that require network slicing within existing 4G LTE networks will thus be needed and to support interworking with 5G networks.

The disclosure provides a way to implement network slicing in networks that support 4G LTE and 5G. In an embodiment, a new dedicated network slicing node can be created between the radio access network (RAN) including nodeB (either eNodeB or gNode), Core Network (Serving Gateway, S-GW and Mobility Management Entity, MME) in 4G LTE. For 5G, a new dedicated network slicing node can be created as a new Network Function (NF) or an entity between gNodeB and Access Mobility Function (AMF). The new dedicated network slicing node enables the network to characterize attributes of slices that are active in the network or that can be generated. The dedicated network slicing node can further be configured to create various network secure enclave functions and dynamically match 4G or 5G network slices to users based on the user's profile and charging model. The dedicated network slicing node can dynamically provision services for users based on profiles, network slice attributes, and network capacity. The user device can be added to either an existing network slice or the user device can be dynamically provisioned to a new network slice.

In some embodiments, the network provider can segment the network to service users who may benefit from network slicing and users who may not need the specified services of a network slice. For example, a dual capability UE that may be capable of operating on a 5G network may nevertheless be placed on a legacy network if there are no requirements for that UE, based on its subscription, to be placed on a network slice. The network provider may optionally place the UE on a network slice, however, based on current network traffic and system capacity.

For networks that were not developed with network slicing capability, the added implementation of network slicing capabilities in such networks may allow for subscription level personalized networks. In some embodiments, a personalized network slice instance that is time-limited and context specific may be provided based on the user's subscription.

When multiple network slice instances are deployed, some network slices may provide the same features but may be allocated to different groups of users, while some network slices may provide different features. In some embodiments, a UE may be served by more than one network slice instance at one time.

Figure 1B:
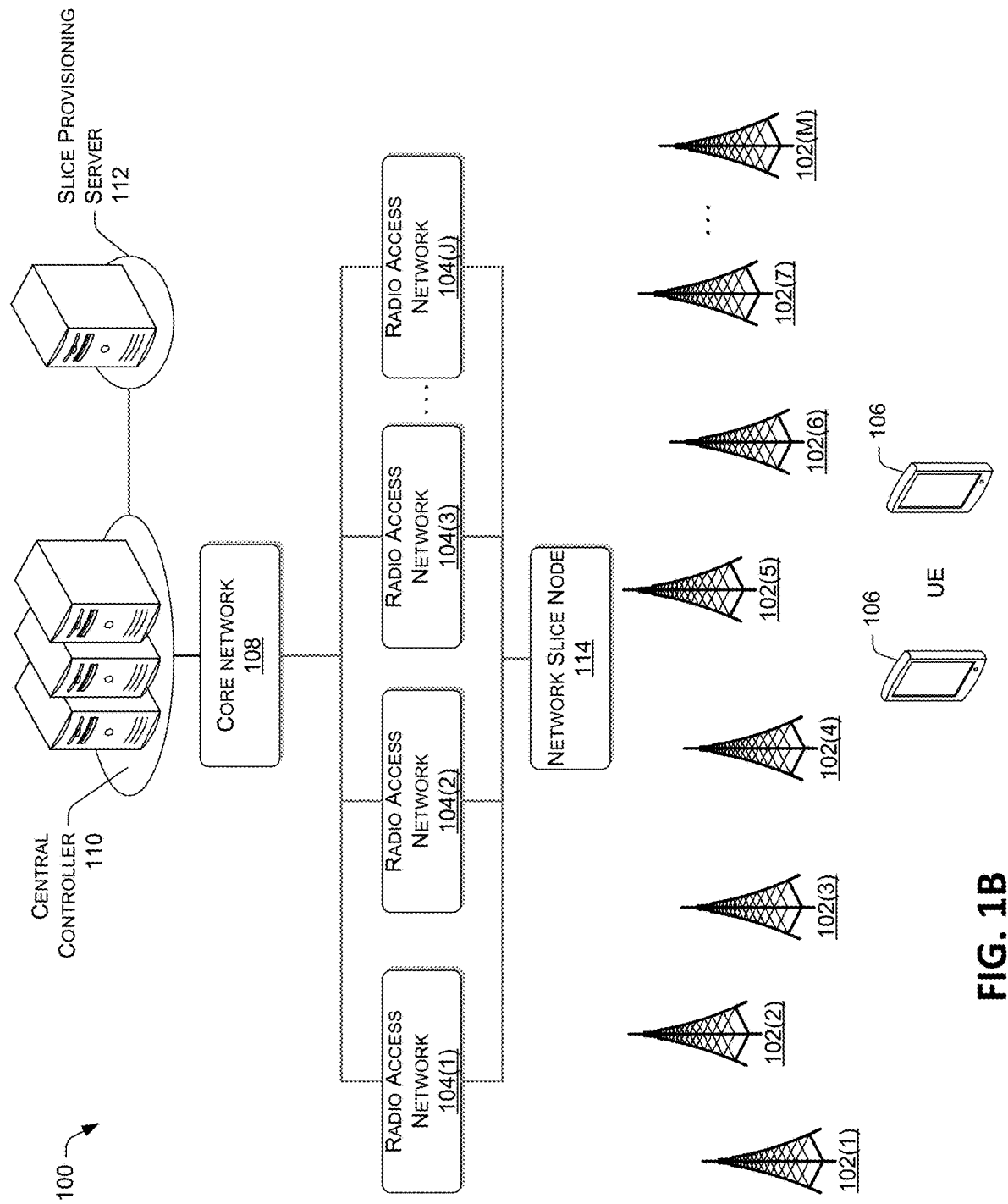
FIG. 1B illustrates an example architecture that implements network slicing in a cellular network.

FIG. 1A is an example implementation of a network system in accordance with the disclosed embodiments. The telecommunication network 100 may include a plurality of hardware, software, and other infrastructure components that may be typical of a large telecommunications provider. The Access Network connects UEs 106 to the subscribers' network provider. FIG. 1B is an example where the network is a wireless network.

FIG. 1B is an example architecture for implementing a wireless network system in accordance with the disclosed embodiments. Cell sites 102(1) to 102(N) may be configured and managed by a central controller 110. The cell sites may be configured individually or by clusters. The wireless telecommunication network 100 may include a plurality of hardware, software, and other infrastructure components that may be typical of a large wireless telecommunications provider. The cell sites 102(1) to 102(N) may be associated with a radio access networks (RANs) 104(1) to 104(N) used for mobile communications. The cell sites 102(1) to 102(N) may be located across different geographic areas to facilitate providing network access and connectivity to users in their corresponding geographic area. The cell sites 102(1) to 102(N) may be base stations, or other network end points (or possibly intermediary points) that exchange communications with user devices, such as mobile telecommunication devices, computing devices, or other devices that have wireless connectivity. The RANs 104 may be in communication with a core network 108.

In accordance with one or more embodiments, the telecommunication network 100 may conform to Universal Mobile Telecommunications System (UMTS) technologies that employ UMTS Terrestrial Radio Access Network (UTRAN). In some instances, the UTRAN may share several components like a Circuit Switch (CS) and a Packet Switch (PS) core network with a GSM EDGE Radio Access Network (GERAN) (Global System for Mobile Communications (GSM), Enhanced Data rates for GSM Evolution (EDGE)). In various instances, a 4G Long Term Evolution (4G LTE) or 5G network that comprises New Radio RAN, LTE RAN Evolved UMTS Terrestrial Radio Access Network (EUTRAN) may be employed to transmit data for the telecommunications networks, besides UMTS or GSM. Thus, different network technologies (and other possible access networks) may coexist to process telecommunications traffic.

In some instances, communications may be handed off between different network technologies such as NR, LTE EUTRAN, UTRAN and GERAN networks (or other networks) and still maintain a communication with a common core network, such as when a UE leaves a range of access (zone) of a network technology to enter another one with another technology. Handoffs may also occur between different types of hardware (e.g., different manufacturers, versions, etc.) for a same network type (e.g., 5G NR, 4G LTE, EUTRAN, UTRAN, GERAN, etc.). For discussion purposes, it will be assumed that the architecture of FIG. 1B represents a 4G LTE or 5G network that includes one or more Node B's (eNodeB's or gNodeB's), represented herein by cell sites 102(1) to 102(N), which provide an interface between a UE, such as a wireless device that is configured to communicate over the radio access network 104(1) to 104(N) and the core network 108. Each NodeB (eNodeB and/or gNodeB) couples with the core network 108 via the mobility management entity (MME) if 4G LTE. For 5G, each gNodeB couple with the Access Mobility Function (AMF) and User Plane Function (UPF).

In accordance with one or more embodiments, other types of networks, Access Networks, and/or components (hardware and/or software) may be employed that enable telecommunications devices to communicate with the core network 108 to facilitate activities such as voice calling, messaging, emailing, accessing the Internet, or other types of data communications. For example, the telecommunication network 100 may be, at least in part, a Wi-Fi based network, a Bluetooth network, or other type of network.

The wireless telecommunication network 100 may include a central controller 110 to manage network performance optimizations for each cell cite and/or cell site cluster. In some embodiments, the central controller may include a self-organizing network or self-optimizing network (SON) controller. The central controller 110 may be in communication with one or more of the various components of the wireless telecommunication network 100, such as the core network 108, one or more intermediaries (not shown), the RANs 104(1) to 104(N), and/or the cell sites 102(1) to 102(N).

Several User Equipment (UE) 106 appear in the drawing, to represent some examples of the devices that may receive various services via the telecommunication network 100. User equipment 106 typically take the form of portable handsets, smart-phones, tablet computers, personal digital assistants (PDAs), and smart watches, although they may be implemented in other form factors, including consumer, sensor, and business electronic devices, sometimes referred to as IoT devices.

Telecommunication network 100 provides communication for user equipment (UE) 106. Telecommunication network 100 allows users of the user devices (e.g., customers or subscribers to the telecommunication network 100) to initiate communication and receive information.

Telecommunication network 100 carries the user communications for the user devices between, for example, eNodeB nodes or gNodeB nodes and other elements with or through which the user devices communicate. Some individual elements such as switches and/or routers forming the wireless telecommunication network 100 are omitted here for simplicity. It will be understood that the various network elements can communicate with each other, as well as other elements of the wireless telecommunication network 100, and other networks (e.g., the public switched telephone network (not shown) and the Internet) either directly or indirectly.

In one embodiment, the telecommunication network 100 includes a slice provisioning server 112 that is configured to communicate with the user devices 106. In one embodiment, the slice provisioning server 112 has a dynamic provisioning engine (e.g., a software program stored in its memory) configured to perform various network slice control functions. In various embodiments, the functions of the dynamic provisioning engine may include determining which of the user devices 106 have subscription profiles and should be placed on an instantiated network slice or if a network slice should be instantiated.

In some embodiments, a network slice node 114 may be implemented to add or implement network slice capability, in particular in existing networks that do not provide network slicing capability.

An instantiated network slice may be configured to provide computing resources to users of user equipment 106. The computing resources provided by the network slice may include various types of resources, such as networking resources, computing resources, resources, data communication resources, and the like. Each type of computing resource may be general-purpose or may be available in a number of specific configurations. For example, computing resources may be available as virtualized resources. The virtualized resources may be configured to execute applications, including Web servers, application servers, media servers, database servers, and the like. Data storage resources may also be provided, such as file storage devices, block storage devices, and the like. Each type or configuration of computing resource may be available in different configurations, such as the number and type of processors, and size of memory and/or storage capacity. The resources may in some embodiments be offered to users with a specified computational capacity (which may be specified by indicating the type and number of CPUs, the main memory size and so on), a specified quality of service, and so forth.

The slice provisioning server 112 may be implemented as multiple servers. It should be appreciated that although the embodiments disclosed above are discussed in the context of network slices using virtualized resources, other types of implementations can be utilized with the concepts and technologies disclosed herein.

It should also be appreciated that wireless telecommunication network 100 described in FIG. 1B is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphones, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
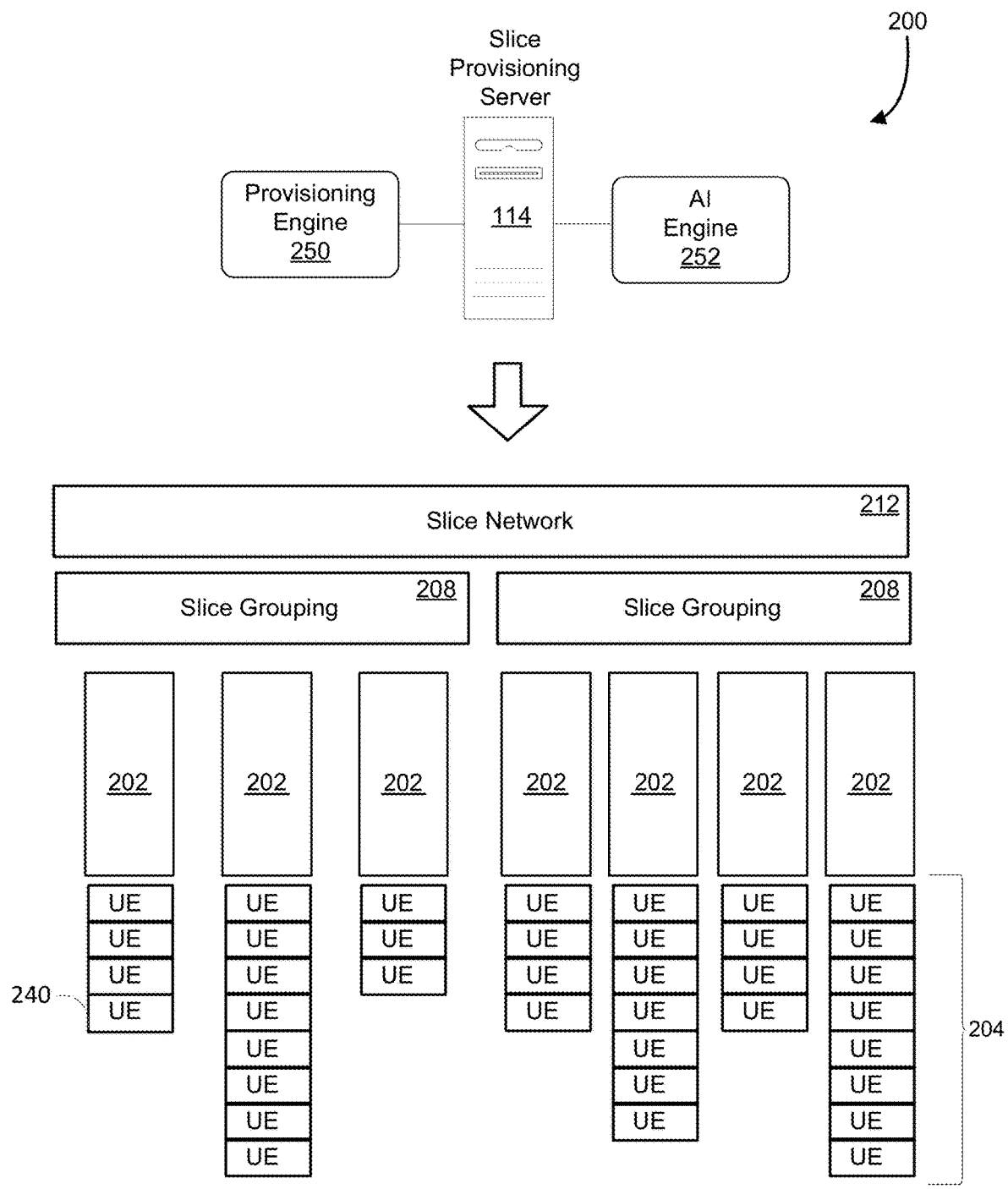
FIG. 2 is an example architecture for implementing network slicing according to one embodiment.

In some embodiments, such as in FIG. 2, illustrated is a wireless network 200 instantiating one or more network slices that may be viewed as a collection of shared computing resources and shared infrastructure. For example, as shown in FIG. 2, a wireless network 200 may include various allocated UE devices 204, network slices 202, slice groupings 208, and slice network 212. The network slices 202 may vary in configurations. A network slice 202 may be shared by multiple user equipment (UE) 240. In some embodiments, networks slices 202 with the same configuration may be grouped as slice groupings 208. Slice groupings 208 may also comprise network slices 202 that are allocated to a subscribing entity. Other types of slice groupings may be implemented. Slice provisioning server 214 may include a memory and processor configured with instructions to manage workflows for instantiating, allocating, and deactivating network slices. A provisioning engine 250 may be implemented that includes functionality described with reference to the dynamic provisioning engine described above for FIG. 1A. Provisioning engine 250 may be configured to determine a placement of a particular UE 240 within a network slice. In some embodiments, this placement may be based at least in part on available resources and/or existing agreements and subscriptions.

In some embodiment, the provisioning engine 250 may be configured to detect and identify various network conditions or other factors and determine if the UE associated with a network slice should be migrated to another network slice. This determination may be made based on one or more criteria, such as load balancing needs as well as service agreements for the particular UE. For example, the provisioning engine 250 may determine if a particular UE requires or would benefit from being hosted on an alternate network slice with different features. The provisioning engine 250 may determine if a candidate network slice is available that meets or exceeds the criteria that is required for the particular UE. It should be noted that the provisioning engine 250 may execute on slice provisioning server 214. In some embodiments, the functionality of provisioning engine 250 may also execute in whole or in part on other components of system 200.

In some embodiments, an AI engine 252 may be implemented that can be used to dynamically provision services for users based on profiles, slice attributes, and network capacity and dynamically provision security services. The AI engine 252 may implement a machine learning model to determine correlations and identifications to support the dynamic provisioning services. In some configurations, the AI engine 252 may be configured to utilize supervised, unsupervised, or reinforcement learning techniques to generate correlations and identifications. For example, AI engine 252 may utilize supervised machine learning techniques by training on collected profile data. In some embodiments, AI engine 252 may also, or alternatively, utilize unsupervised machine learning techniques to determine correlations including, but is not limited to, a clustering-based model, a forecasting-based model, a smoothing-based model, or another type of unsupervised machine learning model. In some embodiments, AI engine 252 may also, or alternately, utilize reinforcement learning techniques to generate results. For example, AI engine 252 may be trained using the input data and, based on feedback, the model may be rewarded based on its output.

Figure 3:
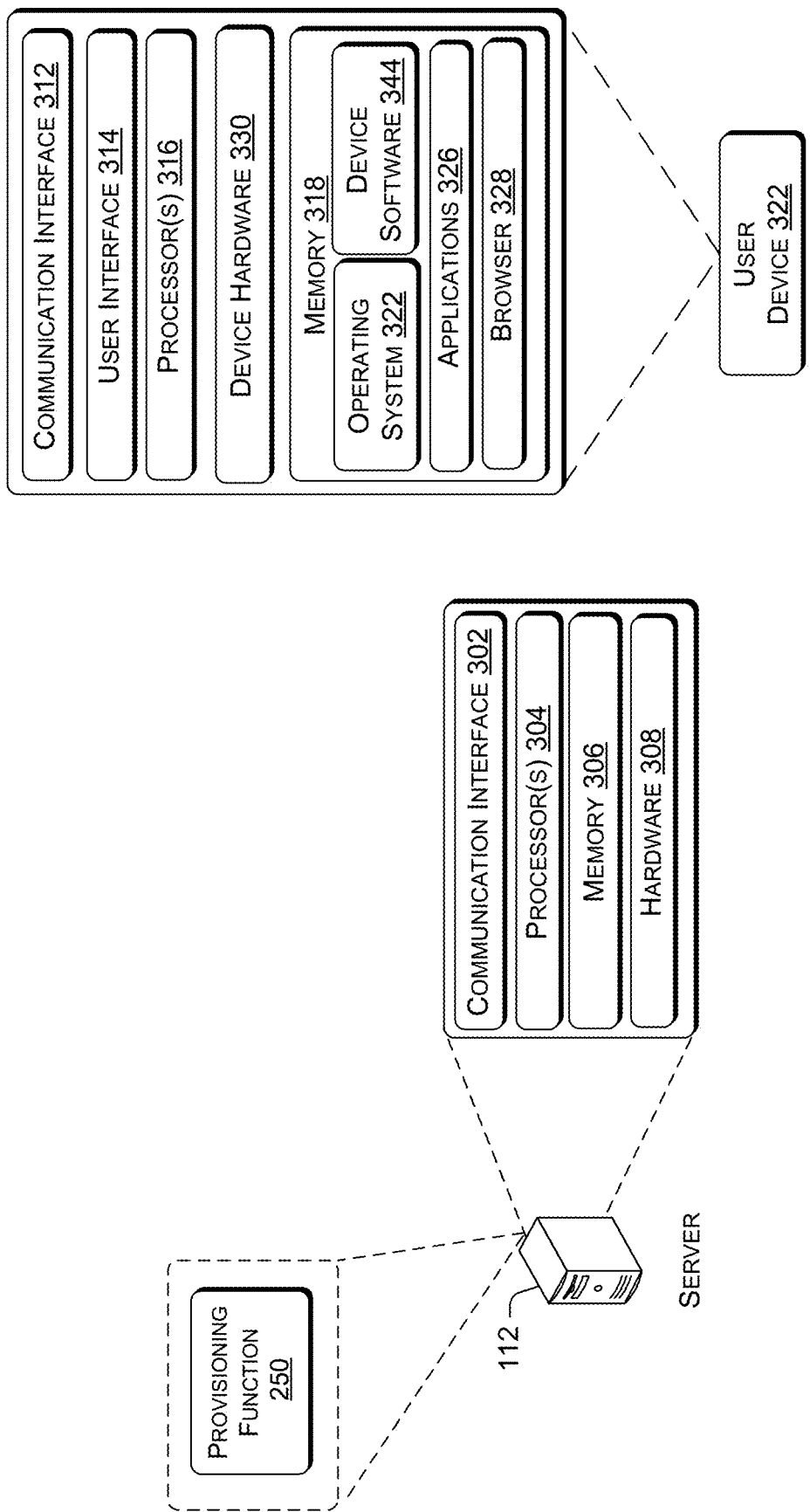
FIG. 3 is a block diagram showing various components of a server and a computing device that support network slicing.

FIG. 3 is a block diagram showing various components of a server 112 and a computing device that support the implementation of network slicing. The server 112 may be implemented using one or more computing nodes. The computing nodes may include a communication interface 302, one or more processors 304, memory 306, and hardware 308. The communication interface 302 may include wireless and/or wired communication components that enable the server 112 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. Computer readable storage media do not consist of propagating data signals or carrier waves. In contrast, communication media may embody computer-readable instructions, data structures, program modules, or other data in a modulated data signal, such as a carrier wave, or other transmission mechanisms. In other embodiments, the server 112 or components thereof may be implemented using virtual computing devices in the form of virtual machines or software containers that are hosted in a computing cloud. The computing cloud may include a variety of disaggregated servers that provide virtual application server functionalities and virtual storage functionalities. In other implementations, the UE, for example an IOT device, may not include a web browser 328.

As shown in FIG. 3, user device 322 may be representative of the UE 106 of FIG. 1. The user device 322 may include a communication interface 312, a user interface 314, one or more processors 316, memory 318, and device hardware 230. The communication interface 312 may include wireless and/or wired communication components that enable the electronic device to transmit or receive voice or data communication via the network provider, as well as other telecommunication and/or data communication networks.

The user interface 314 may enable a user to provide input and receive output from the user device 322. The user interface 314 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 318 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 330 may include a modem that enables the user device 322 to perform telecommunication and data communication with a network. The device hardware 330 may further include signal converters, antennas, hardware decoders and encoders, graphics processors, a universal integrated circuit card (UICC) or an embedded UICC (eUICC), and/or the like that enable the user device 322 to execute applications and provide telecommunication and data communication functions.

The one or more processors 316 and the memory 318 of the user device 322 may implement an operating system 322, device software 324, one or more applications 326, and a web browser 328. Such software may include routines, program instructions, objects, and/or data structures that are executed by the processors 316 to perform particular tasks or implement particular abstract data types.

The operating system 322 may include components that enable the user device 322 to receive and transmit data via various interfaces (e.g., user controls, communication interface 312, and/or memory input/output devices). The operating system 322 may also process data using the one or more processors 316 to generate output based on input that is received via the user interface 314. For example, the operating system 322 may provide an execution environment for the execution of the applications 326 and the web browser 328. The operating system 322 may include a presentation component that presents the output (e.g., display the data on an electronic display, store the data in memory, transmit the data to another electronic device, etc.).

The operating system 322 may include an interface layer that enables applications to interface with the modem and/or the communication interface 312. The interface layer may comprise public APIs, private APIs, or a combination of both public APIs and private APIs. Additionally, the operating system 322 may include other components that perform various other functions generally associated with an operating system. The device software 324 may include software components that enable the user device to perform functions. For example, the device software 324 may include basic input/output system (BIOS), bootrom, or a bootloader that boots up the user device 322 and executes the operating system 322 following power-up of the device.

The applications 326 may include applications that provide utility, entertainment, and/or productivity functionalities to a user of the user device 322. For example, the applications 326 may include telephony applications, electronic mail applications, remote desktop applications, navigation applications, office productivity applications, multimedia streaming applications, an online shopping application, and/or so forth. The web browser 328 may enable a user to access web pages provided via network services provided by system 100.

It should be appreciated that the subject matter described herein may be implemented as a computer-controlled apparatus, a computer process, a computing system, or as an article of manufacture such as a computer-readable storage medium. The various described services and functions may be remotely implemented such as on a server or may be implemented on one or more devices. Among many other benefits, the techniques shown herein improve efficiencies with respect to a wide range of computing resources. Thus, data is distributed based on need, thus improving the efficiency of storage and network resources. Other technical effects, other than those mentioned herein, can also be realized from implementations of the technologies disclosed herein.

Figure 4:
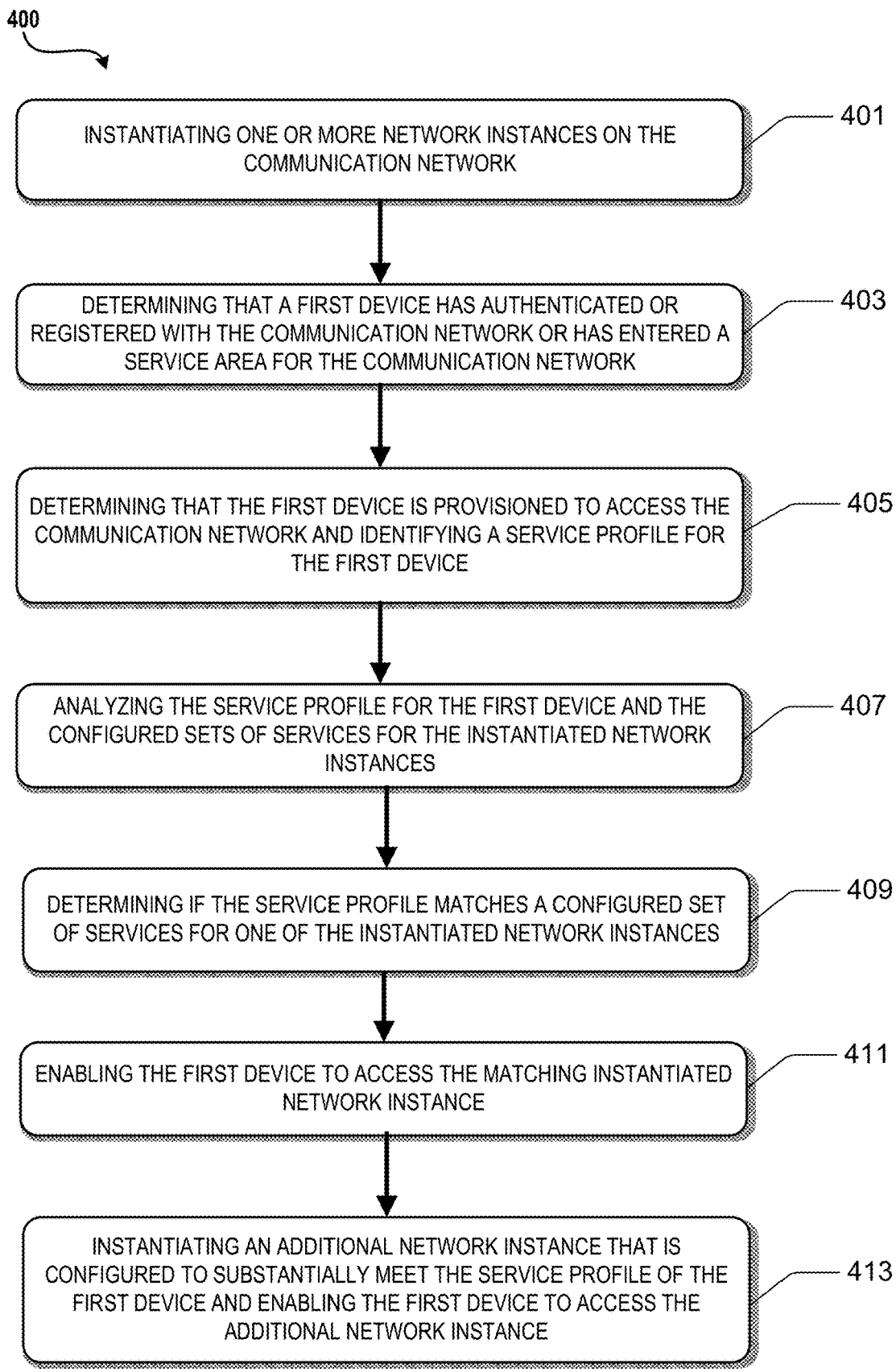
FIG. 4 illustrates a flow diagram of an example process for implementing a network slicing system.
Figure 5:
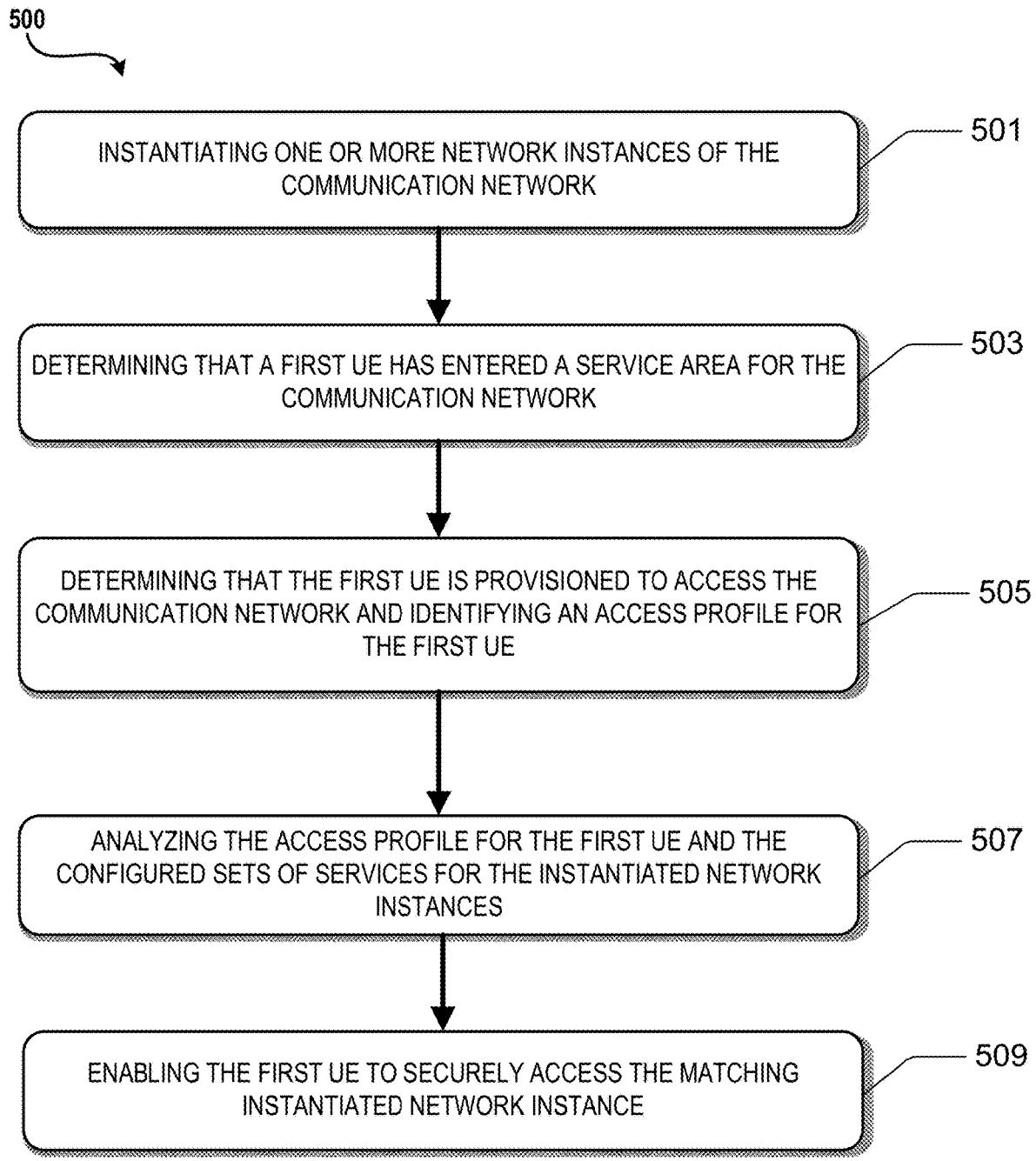
FIG. 5 illustrates a flow diagram of an example process for a network slicing system.
Figure 6:
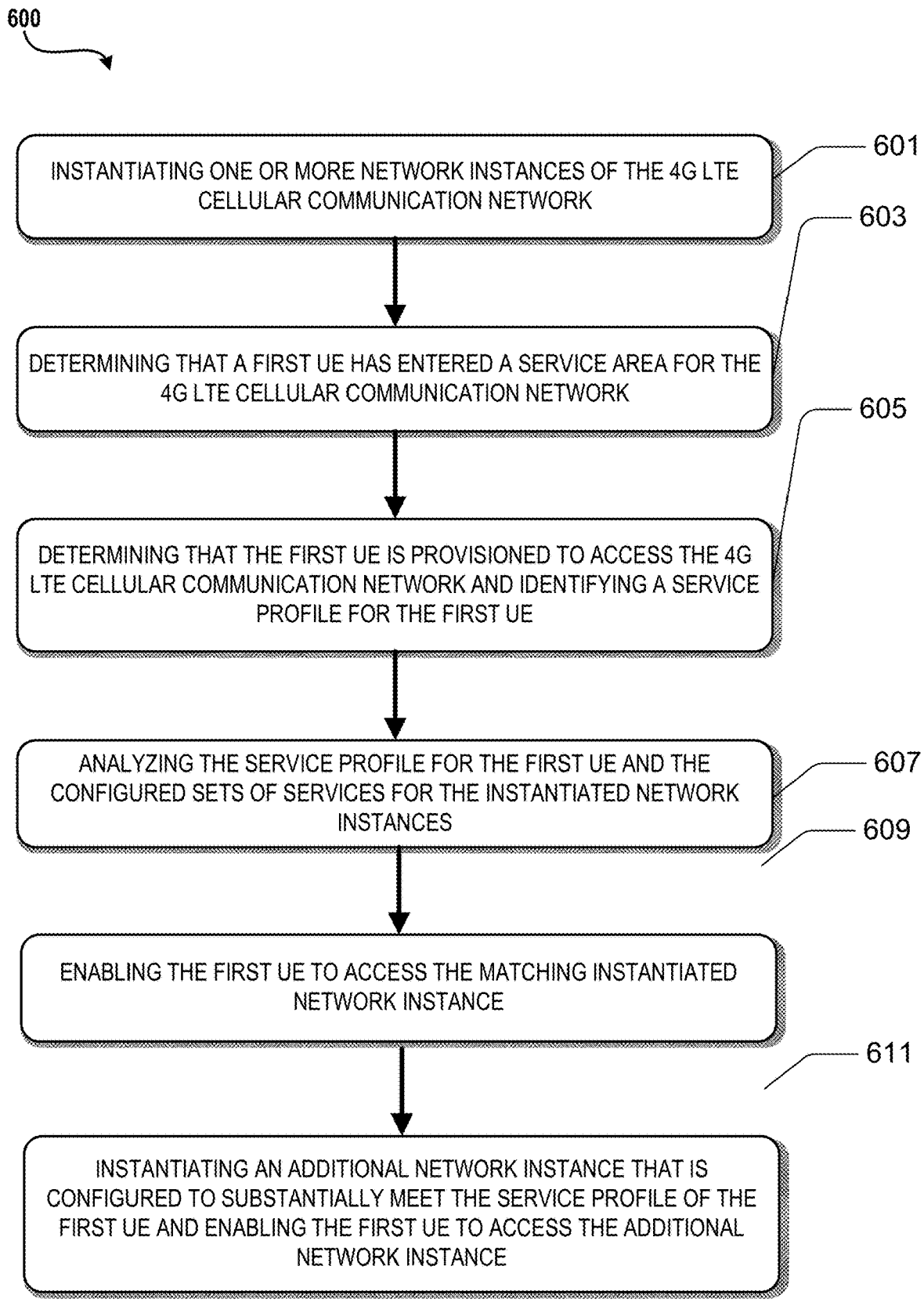
FIG. 6 is a flow diagram of an example process for a network slicing system.

FIGS. 4-6 present illustrative processes 400-600 for implementing functionality associated with network slicing. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described for each process is not intended to be construed as a limitation, and any number of the described blocks can be combined in any order and/or in parallel to implement the process.

FIG. 4 illustrates an example operational procedure for implementing a communication network, in accordance with the present disclosure. The operational procedure may be implemented in a system comprising one or more computing devices. Referring to FIG. 4, operation 401 illustrates instantiating one or more network slice instances on the communication network, each of the network instances configured to provide a configured set of services that are accessible to a controlled set of devices.

Operation 401 may be followed by operation 403. Operation 403 illustrates determining that a first device has authenticated or registered with the communication network or has entered a service area for the communication network.

Operation 403 may be followed by operation 405. Operation 405 illustrates determining that the first device is provisioned to access the communication network and identifying a service profile for the first device;

Operation 405 may be followed by operation 407. Operation 407 illustrates analyzing the service profile for the first device and the configured sets of services for the instantiated network instances. For example, the service profile (also referred to as a network slice profile) may be generated based on one more selectable parameters that have been established by the network provider. Selectable parameters may be provided for each of a number of categories such as latency, security, quality of service, storage, and the like. Operation 407 may be followed by operation 409. Operation 409 illustrates based on the analyzing, determining if the service profile matches a configured set of services for one of the instantiated network instances. Operation 409 may be followed by operation 411. Operation 411 illustrates, based on the analyzing, determining if the service profile matches a configured set of services for one of the instantiated network instances.

Operation 411 may be followed by operation 413. Operation 413 illustrates, in response to determining that the service profile matches a configured set of services for one of the instantiated network instances, enabling the first device to access the matching instantiated network instance.

Operation 413 may be followed by operation 415. Operation 415 illustrates, in response to determining that none of the configured set of services of the instantiated network instances match the service profile of the first device, instantiating an additional network instance that is configured to substantially meet the service profile of the first device and enabling the first device to access the additional network instance.

In an embodiment, the instantiated additional network instance or the matching instantiated network instance is reserved exclusively for user devices associated with a subscribing entity. In some embodiments, the instantiated additional network instance or the matching instantiated network instance are accessible by user devices associated with different subscribing entities.

In an embodiment, the operations may include deactivating one or more of the instantiated network instances in response to determining that no user devices are accessing the one or more instantiated network instances. In some embodiments, a number of un-used or minimally-used network slices may be maintained based on service requirements, or if it is determined that the network slices will likely be needed based on prior history or as determined by the AI engine. In one embodiment, a minimum or maximum number of network slices may be determined according to a threshold. If there are too few slices that are active, additional slices may be activated. Some network slices may be deactivated when the number unused (reserve) network slices exceeds a maximum number.

In an embodiment, the service profile comprises one or more of scalability, throughput, latency, or security. In some embodiments, the service profile comprises a charging model.

In an embodiment, the analyzing is performed by a machine learning component. For example, the machine learning component may be implemented on AI engine 252 of FIG. 2.

FIG. 5 illustrates an example operational procedure for implementing a communication network, in accordance with the present disclosure. The operational procedure may be implemented in a system comprising one or more computing devices. Referring to FIG. 5, operation 501 illustrates instantiating one or more network instances of the communication network, each of the network instances configured to provide a configured set of services that are associated with controlled access to a set of user equipment (UE).

Operation 501 may be followed by operation 503. Operation 503 illustrates determining that a first UE has entered a service area for the communication network.

Operation 503 may be followed by operation 505. Operation 505 illustrates determining that the first UE is provisioned to access the communication network and identifying an access profile for the first UE.

Operation 505 may be followed by operation 507. Operation 507 illustrates analyzing the access profile for the first UE and the configured sets of services for the instantiated network instances.

Operation 507 may be followed by operation 509. Operation 509 illustrates, in response to determining that the access profile matches security capabilities of a configured set of services for one of the instantiated network instances, enabling the first UE to securely access the matching instantiated network instance.

In an embodiment, the operations may include, based on the analyzing, in response to determining that none of the configured set of services of the instantiated network instances match the access profile of the first user device, instantiating an additional network instance that is configured to substantially meet the access profile of the first user device and enabling the first user device to securely access the additional network instance.

In an embodiment, the operations may include deactivating one or more of the instantiated network instances in response to determining that no user devices are accessing the one or more instantiated network instances.

In an embodiment, the analyzing is performed by a machine learning component. In an embodiment, the analyzing comprises determining a service level agreement associated with the first user device.

In an embodiment, the operations may include analyzing service profiles for a plurality of user devices, wherein the analyzing comprises determining service level agreements associated with the plurality of user devices. In an embodiment, the operations may further include determining a role associated with the first user device and enabling the first user device to securely access the matching instantiated network instance based on an authorizations and permissions associated with the first user device.

FIG. 6 illustrates an example operational procedure for managing access to a 4G LTE cellular or 5G communication network, in accordance with the present disclosure. The operational procedure may be implemented in a system comprising one or more computing devices. Referring to FIG. 6, operation 601 illustrates instantiating one or more network instances of the 4G LTE cellular communication network, each of the network instances configured to provide a configured set of services that are accessible to a controlled set of user equipment (UE).

Operation 601 may be followed by operation 603. Operation 603 illustrates determining, by a dedicated node in the 4G LTE cellular communication network, that a first UE has entered a service area for the 4G LTE cellular communication network.

Operation 603 may be followed by operation 605. Operation 605 illustrates determining that the first UE is provisioned to access the 4G LTE cellular communication network and identifying a service profile for the first UE.

Operation 605 may be followed by operation 607. Operation 607 illustrates analyzing the service profile for the first UE and the configured sets of services for the instantiated network instances.

Operation 607 may be followed by operation 609. Operation 609 illustrates, in response to determining that the service profile matches a configured set of services for one of the instantiated network instances, enabling the first UE to access the matching instantiated network instance. Operation 609 may be followed by operation 611. Operation 611 illustrates, in response to determining that none of the configured set of services of the instantiated network instances match the service profile of the first UE, instantiating an additional network instance that is configured to substantially meet the service profile of the first UE and enabling the first UE to access the additional network instance.

In an embodiment, the service profile comprises one or more of scalability, throughput, latency, or security. In an embodiment, the service profile comprises a charging model.

In an embodiment, the managing access is performed by the dedicated node between a radio access network (RAN) and Base Transceiver Station (BTS), eNodeB or gNode.

In an embodiment, the analyzing is performed by a machine learning component.

In an embodiment, the operations may include deactivating one or more of the instantiated network instances in response to determining that no user devices are accessing the one or more instantiated network instances.

In an embodiment, the instantiated additional network instance or the matching instantiated network instance is reserved exclusively for user devices associated with a subscribing entity. In an embodiment, the instantiated additional network instance or the matching instantiated network instance are accessible by user devices associated with different subscribing entities.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of implementing a communication network, the method comprising:
    instantiating a first network slice instance and a second network slice instance on the communication network, each of the first and second network instances configured to provide a configured set of services that are accessible to a controlled set of devices;
    determining that a first device has authenticated or registered with the communication network or has entered a service area for the communication network;
    determining that the first device is provisioned to access the communication network and identifying a service profile for the first device;
    analyzing the service profile for the first device and the configured sets of services for the instantiated first and second network instances;
    based on the analyzing the service profile for the first device and the configured sets of services for the instantiated first and second network instances, determining that the service profile for the first device matches the configured set of services for the instantiated first network instance;
    based on the analyzing the service profile for the first device and the configured sets of services for the instantiated first and second network instances, determining that the service profile for the first device does not match the configured set of services for the instantiated second network instance;
    determining that no service profiles for other devices match the configured set of services for the instantiated second network instance;
    in response to determining that the service profile for the first device matches the configured set of services for the instantiated first network instance, enabling the first device to access the instantiated first network instance; and
    in response to (i) determining that the service profile for the first device does not match the configured set of services for the instantiated second network instance and (ii) determining that no service profiles for other devices match the configured set of services for the instantiated second network instance, deactivating the instantiated second network instance.

2. The method of claim 1, wherein the service profile comprises one or more of scalability, throughput, latency, or security.

3. The method of claim 1, wherein the service profile comprises a charging model.

4. The method of claim 1, wherein analyzing the service profile for the first device and the configured sets of services for the instantiated first and second network instances comprises:
    providing the service profile for the first device and the configured sets of services for the instantiated first and second network instances, as an input to a machine learning model that is trained on historical data; and
    receiving, from the machine learning model, data indicating whether the service profile for the first device matches the configured set of services for the instantiated first or second network instances.

5. The method of claim 1, comprising:
    determining that a second device has authenticated or registered with the communication network or has entered the service area for the communication network;
    determining that the second device is provisioned to access the communication network and identifying a service profile for the second device;
    analyzing the service profile for the second device and the configured sets of services for the instantiated first network instance;
    based on analyzing the service profile for the second device and the configured sets of services for the instantiated first network instance, determining that the service profile for the second device does not match the configured set of services for the instantiated first network instance; and
    in response to determining that the service profile for the second device does not match the configured set of services for the instantiated first network instance, instantiating an additional network instance that is configured to substantially meet the service profile for the second device and enabling the second device to address the instantiated additional network instance.

6. The method of claim 5, wherein the instantiated additional network instance or the instantiated first network instance is reserved exclusively for devices associated with a subscribing entity.

7. The method of claim 5, wherein the instantiated additional network instance or the instantiated first network instance are accessible by devices associated with different subscribing entities.

8. A system comprising:
    one or more processors;
    a memory in communication with the one or more processors, the memory having computer-readable instructions stored thereupon which, when executed by the one or more processors, cause the system to perform operations comprising:
        instantiating a first network slice instance and a second network slice instance on the communication network, each of the first and second network instances configured to provide a configured set of services that are accessible to a controlled set of devices;

determining that a first device has authenticated or registered with the communication network or has entered a service area for the communication network;

determining that the first device is provisioned to access the communication network and identifying a service profile for the first device;

analyzing the service profile for the first device and the configured sets of services for the instantiated first and second network instances;

based on the analyzing the service profile for the first device and the configured sets of services for the instantiated first and second network instances, determining that the service profile for the first device matches the configured set of services for the instantiated first network instance;

based on the analyzing the service profile for the first device and the configured sets of services for the instantiated first and second network instances, determining that the service profile for the first device does not match the configured set of services for the instantiated second network instance;

determining that no service profiles for other devices match the configured set of services for the instantiated second network instance;

in response to determining that the service profile for the first device matches the configured set of services for the instantiated first network instance, enabling the first device to access the instantiated first network instance; and in response to (i) determining that the service profile for the first device does not match the configured set of services for the instantiated second network instance and (ii) determining that no service profiles for other devices match the configured set of services for the instantiated second network instance, deactivating the instantiated second network instance.

9. The system of claim 8, wherein the service profile comprises one or more of scalability, throughput, latency, or security.

10. The system of claim 8, wherein the service profile comprises a charging model.

11. The system of claim 8, wherein analyzing the service profile for the first device and the configured sets of services for the instantiated first and second network instances comprises:

providing the service profile for the first device and the configured sets of services for the instantiated first and second network instances, as an input to a machine learning model that is trained on historical data; and receiving, from the machine learning model, data indicating whether the service profile for the first device matches the configured set of services for the instantiated first or second network instances.

12. The system of claim 8, wherein the operations comprise:

determining that a second device has authenticated or registered with the communication network or has entered the service area for the communication network;

determining that the second device is provisioned to access the communication network and identifying a service profile for the second device;

analyzing the service profile for the second device and the configured sets of services for the instantiated first network instance;

based on analyzing the service profile for the second device and the configured sets of services for the instantiated first network instance, determining that the service profile for the second device does not match the configured set of services for the instantiated first network instance; and in response to determining that the service profile for the second device does not match the configured set of services for the instantiated first network instance, instantiating an additional network instance that is configured to substantially meet the service profile for the second device and enabling the second device to address the instantiated additional network instance.

13. The system of claim 12, wherein the instantiated additional network instance or the instantiated first network instance is reserved exclusively for user devices associated with a subscribing entity.

14. The system of claim 12, wherein the instantiated additional network instance or the instantiated first network instance are accessible by user devices associated with different subscribing entities.

15. A non-transitory computer-readable medium including computer-executable instructions that, if executed by a computing device, cause the computing device to perform operations comprising:

instantiating a first network slice instance and a second network slice instance on the communication network, each of the first and second network instances configured to provide a configured set of services that are accessible to a controlled set of devices;

determining that a first device has authenticated or registered with the communication network or has entered a service area for the communication network;

determining that the first device is provisioned to access the communication network and identifying a service profile for the first device;

analyzing the service profile for the first device and the configured sets of services for the instantiated first and second network instances;

based on the analyzing the service profile for the first device and the configured sets of services for the instantiated first and second network instances, determining that the service profile for the first device matches the configured set of services for the instantiated first network instance;

based on the analyzing the service profile for the first device and the configured sets of services for the instantiated first and second network instances, determining that the service profile for the first device does not match the configured set of services for the instantiated second network instance;

determining that no service profiles for other devices match the configured set of services for the instantiated second network instance;

in response to determining that the service profile for the first device matches the configured set of services for the instantiated first network instance, enabling the first device to access the instantiated first network instance; and in response to (i) determining that the service profile for the first device does not match the configured set of services for the instantiated second network instance and (ii) determining that no service profiles for other devices match the configured set of services for the instantiated second network instance, deactivating the instantiated second network instance.

16. The non-transitory computer-readable medium of claim 15, wherein the service profile comprises one or more of scalability, throughput, latency, or security.

17. The non-transitory computer-readable medium of claim 15, wherein analyzing the service profile for the first device and the configured sets of services for the instantiated first and second network instances comprises:
providing the service profile for the first device and the configured sets of services for the instantiated first and second network instances, as an input to a machine learning model that is trained on historical data; and
receiving, from the machine learning model, data indicating whether the service profile for the first device matches the configured set of services for the instantiated first or second network instances.

18. The non-transitory computer-readable medium of claim 15, wherein the operations comprise:
determining that a second device has authenticated or registered with the communication network or has entered the service area for the communication network;
determining that the second device is provisioned to access the communication network and identifying a service profile for the second device;
analyzing the service profile for the second device and the configured sets of services for the instantiated first network instance;
based on analyzing the service profile for the second device and the configured sets of services for the instantiated first network instance, determining that the service profile for the second device does not match the configured set of services for the instantiated first network instance; and
in response to determining that the service profile for the second device does not match the configured set of services for the instantiated first network instance, instantiating an additional network instance that is configured to substantially meet the service profile for the second device and enabling the second device to address the instantiated additional network instance.

19. The non-transitory computer-readable medium of claim 18, wherein the instantiated additional network instance or the instantiated first network instance is reserved exclusively for user devices associated with a subscribing entity.

20. The non-transitory computer-readable medium of claim 18, wherein the instantiated additional network instance or the instantiated first network instance are accessible by user devices associated with different subscribing entities.

* * * * *